US009214137B2

(12) United States Patent
Bala et al.

(10) Patent No.: US 9,214,137 B2
(45) Date of Patent: Dec. 15, 2015

(54) METHODS AND SYSTEMS FOR REALISTIC RENDERING OF DIGITAL OBJECTS IN AUGMENTED REALITY

(75) Inventors: Raja Bala, Pittsford, NY (US);
Hengzhou Ding, Webster, NY (US);
Yonghui Zhao, Penfield, NY (US);
Michael R. Furst, Penfield, NY (US);
Pramod Sankar Kompalli, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 334 days.

(21) Appl. No.: 13/525,959

(22) Filed: Jun. 18, 2012

(65) Prior Publication Data

US 2013/0335445 A1    Dec. 19, 2013

(51) Int. Cl.
G09G 5/377 (2006.01)
G09G 5/14 (2006.01)
G06F 3/147 (2006.01)

(52) U.S. Cl.
CPC ........ G09G 5/14 (2013.01); G06F 3/147 (2013.01); G09G 2340/12 (2013.01); G09G 2354/00 (2013.01); G09G 2356/00 (2013.01)

(58) Field of Classification Search
None
See application file for complete search history.

(56) References Cited

U.S. PATENT DOCUMENTS

2006/0105838 A1* 5/2006 Mullen .................. 463/31
2007/0143082 A1* 6/2007 Degnan ................. 703/1
2012/0027305 A1* 2/2012 Kim et al. ............. 382/195
2012/0113144 A1* 5/2012 Adhikari et al. ....... 345/633
2012/0231424 A1* 9/2012 Calman et al. ........ 434/72
2013/0121559 A1* 5/2013 Hu et al. .............. 382/154

OTHER PUBLICATIONS

Girod et al., "Mobile Visual Search—Linking the Virtual and Physical Worlds", IEEE Signal Processing Magazine [61], Jul. 2011.
Hull et al., "Paper-Based Augmented Reality", 17th International Conference on Artificial Reality and Telexistence 2007, pp. 205-209.
Skoczewski et al., "Augmented Reality System for Accelerometer Equipped Mobile Devices", 9th IEEE/ACIS International Conference on Computer and Information Science, 2010, pp. 209-214.
Gil et al., "inContexto—A Fusion Architecture to Obtain Mobile Context", IEEE, 2011, 8 pages.
Yilmaz et al., "Object Tracking: A Survey", ACM Computing Surveys, vol. 38, No. 4, Article 13, Dec. 2006.
Chen et al., "Streaminrg Mobile Augmented Reality on Mobile Phones", Mar. 2009, 2 pages.
R. Bala et al. Rendering Personalized Text on Curved Image Surfaces, U.S Appl. No. 12/964,820, filed Dec. 10, 2010.
R. Bala et al. Methods and Systems for Analyzing and Rating Images for Personalization, U.S. Appl. No. 13/349,751, filed Jan. 13, 2012.

* cited by examiner

*Primary Examiner* — Joni Richer
*Assistant Examiner* — Yi Wang
(74) *Attorney, Agent, or Firm* — MH2 Technology Law Group LLP

(57) ABSTRACT

A system and method of rendering in real time a virtual object onto a viewfinder display, the method comprising determining one or more scene properties of a scene on a viewfinder display of a device, receiving a virtual object for insertion into the scene, determining a location for placing the virtual object within the scene, determining a first appearance of the virtual object based on the one or more scene properties, and inserting the virtual object with the first appearance into the scene depicted on the viewfinder display of the device based on the location.

20 Claims, 4 Drawing Sheets

METHODS AND SYSTEMS FOR REALISTIC RENDERING OF DIGITAL OBJECTS IN AUGMENTED REALITY

TECHNICAL FIELD

The present disclosure relates generally to methods, systems, and computer-readable media for rendering digital objects onto real-time scenes.

BACKGROUND

Augmented Reality (hereinafter, "AR") generally refers to a digital depiction of a live scene in the physical world captured by a camera with computer-generated elements interposed or rendered within the live view, creating an augmented live view.

FIG. 1 is a diagram depicting an exemplary scene captured by a computing device parallel to a background planar surface. As depicted in FIG. 1, background objects, such as whiteboard 120 and plant 130, can be captured within a viewfinder on a display of a computing device that utilizes a camera, such as tablet computer 100 with display screen 110 and a camera lens (not pictured). Display screen 110 can display a depiction of the physical world which includes a digital representation of whiteboard 120 (125) and a digital representation of plant 130 (135). Through the use of AR technology, tablet computer 100 can additionally render a digital object not physically present within the live scene on display 110, such as digital painting 140.

AR technology has numerous uses in various fields, such as advertising, entertainment, education, sports, and design. Furthermore, AR applications can be implemented on a wide range of commonly used devices that include camera attachments and digital displays, such as cellular phones, tablet computers, digital cameras, and laptops. Accordingly, AR technology is a powerful yet accessible tool. AR technology can be used by professional users, such as professional designers, to view completed projects in a live scene before any physical labor is performed. Additionally, AR technology can be used by lay users, such as smart phone or tablet computer owners, for entertainment purposes or to perform household or office tasks, such as home or office design.

However, while FIG. 1 depicts the capture of a live scene from a direct view with tablet computer 100 positioned to be parallel to the background planar surface, often users may desire to view live scenes from perspectives that are not direct. However, viewing live scenes augmented with digital objects from non-direct perspectives can lead to complications with rendering the digital object in a realistic fashion.

For example, FIG. 2 is a diagram depicting an exemplary scene captured by a computing device that is not parallel to a background planar surface. As depicted in FIG. 2, background objects, such as whiteboard 220 and plant 230, can be captured within a viewfinder on a display of a computing device that utilizes a camera, such as tablet computer 200 with display screen 210 and a camera lens (not pictured). Display screen 210 can display a digital depiction of a physical scene which includes a digital representation of whiteboard 220 (225) and a digital representation of plant 230 (235). FIG. 2 depicts the capture of a live scene from a view that is not direct because tablet computer 200 is not positioned to be parallel to a background planar surface. Accordingly, while whiteboard 230 is, in reality, rectangular in shape, the digital representation of whiteboard 220 (225) appears skewed on the viewfinder.

Through the use of AR technology, tablet computer 200 can additionally render a digital object not physically present within the live scene on display 210, such as digital painting 240. However, digital painting 240 is rendered onto the digital scene in a rectangular shape and, accordingly, does not appear realistic within the scene captured on digital display 210 compared to the skewed shape of the digital representation of whiteboard 220 (225).

AR technologies currently include methods for manipulating perspectives of digital objects augmented on to live scenes. However, to maintain realism the manipulated perspective of the digital object should continuously match the perspective of the background objects within the display, even if the perspective of the background changes through the movement of the camera or background objects.

One method for matching perspectives of digital objects with the perspectives of background objects in a digital display is through the use of a specifically designed physical reference object. For example, a physical reference object with known dimensions can be placed in a location the user desires to render a digital object. The user can then capture the scene on a viewfinder on a display of a computing device with a camera attachment, and an AR application can digitally replace the physical reference object with the desired digital object in the live scene.

However, the placement and use of a physical reference object can be cumbersome, and such physical reference objects may not be readily available to lay users of devices, such as cellular phone and tablet computer owners. Accordingly, AR technology may be improved by techniques for detecting changes in scene properties, such as scene geometry, without the use of physical reference images.

SUMMARY OF THE DISCLOSURE

The present disclosure relates generally to methods, systems, and computer readable media for providing these and other improvements to AR technology.

In some embodiments, a user can initiate an AR application on a portable computing device that includes an attached camera and digital display, such as a tablet computer. The application can activate the camera and run a viewfinder of the camera on the digital display.

The user can then position the device such that the camera captures a view of a scene the user wishes to augment with a digital image. For example, the user can position the device such that the camera captures a view that is parallel to a planar surface, such as a wall. Accordingly, the wall and any background objects within the view of the camera will appear on the viewfinder display.

The user may then select a digital object that he/she wishes to render onto the live scene depicted in the viewfinder. For example, the user may select a digital representation of a framed painting. The user can then select a location on the viewfinder display in which to place the digital object. The application can then determine scene properties of the scene depicted in the viewfinder display, such as scene geometry, lighting, inter-reflection, and shadow. Based on the determined scene properties, the application can manipulate the digital object to match the determined scene properties. The application can then render the manipulated digital object onto the live scene depicted on the viewfinder display.

The user may then desire to view the live augmented scene from a different angle. The user may move the device such that the camera has a view that is no longer parallel to the planar surface. The application can detect which scene properties within the viewfinder display have changed. Based on the changed scene properties, the application can manipulate the digital object to match the current scene properties. The application can then render the new manipulated digital object onto the live scene in real time.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
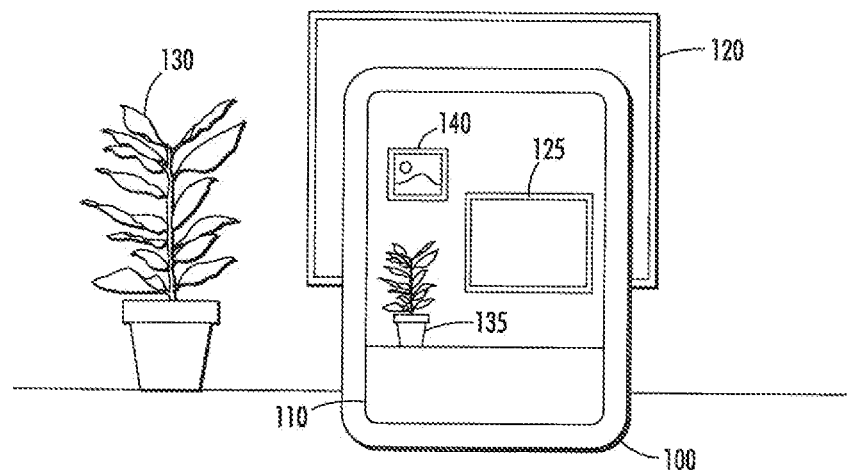
FIG. 1 is a diagram depicting an exemplary scene captured by a computing device parallel to a background planar surface.

The following detailed description refers to the accompanying drawings. Wherever possible, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 3:
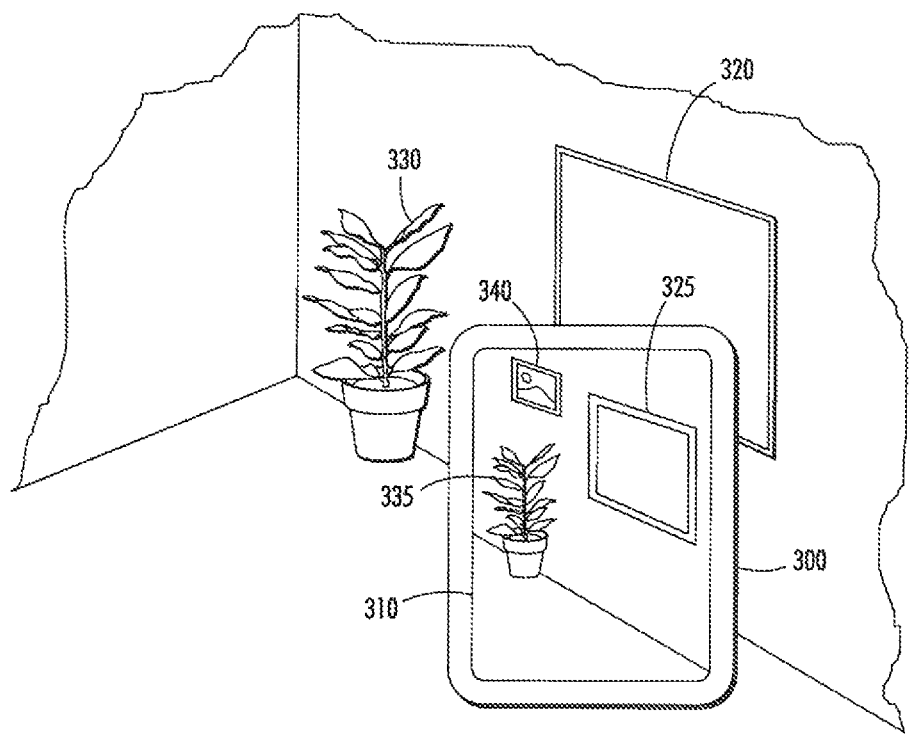
FIG. 3 is a diagram depicting an exemplary scene captured by a computing device that is not parallel to a background planar surface, consistent with certain disclosed embodiments.

FIG. 3 is a diagram depicting an exemplary scene captured by a computing device that is not parallel to a background planar surface, consistent with certain disclosed embodiments. As depicted in FIG. 3, background objects, such as whiteboard 320 and plant 330, can be captured within a viewfinder on a display of a computing device that utilizes a camera, such as computing device 300 with display screen 310 and a camera lens (not pictured). Those skilled in the art will appreciate that computing device 300 can represent any type of device with a digital display and a camera attachment, such as a digital camera, tablet computer, a mobile phone, or a laptop computer. Further, the digital display and the camera can be integrated with computing device 300 or can be non-integrated accessories.

Display screen 310 can display a digital depiction of the physical scene and include a digital representation of whiteboard 320 (325) and a digital representation of plant 330 (335). FIG. 3 depicts the capture of a live scene from a view that is not direct, and computing device 300 is not positioned parallel to a background planar surface. Accordingly, while whiteboard 320 is, in reality, rectangular in shape, the digital representation of whiteboard 320 (325) appears skewed on the viewfinder due to perspective projection.

Figure 2:
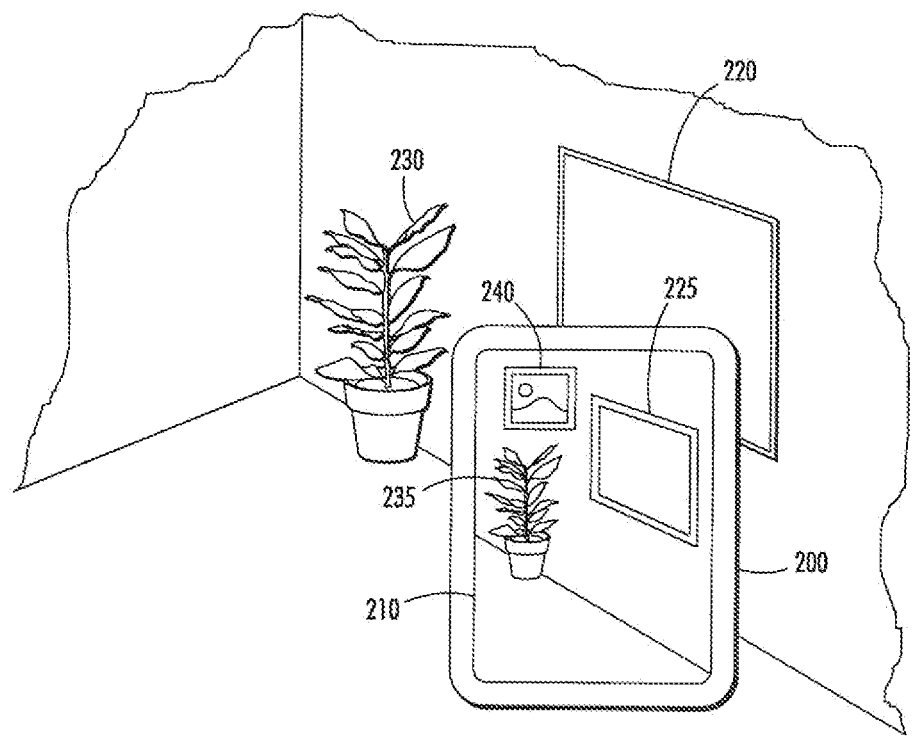
FIG. 2 is a diagram depicting an exemplary scene captured by a computing device that is not parallel to a background planar surface.

Through the use of AR technology, computing device 300 can additionally render a digital object not physical present within the live scene on display 310, such as digital painting 340. However, dissimilar to digital painting 240 in FIG. 2, computing device 300 can analyze properties of the scene depicted on digital display 310 and determine that the angle of the view has created altered geometry for certain background objects. Accordingly, digital painting 340 can be manipulated based on the determined scene properties before being rendered on the display.

For example, the perspective geometry of digital painting 340 can be altered to appear similar to the perspective geometry of the digital representation of whiteboard 320 (325), which is located on the same planar surface as the desired location of digital painting 340. Because digital painting 340 has been manipulated to appear skewed in a matter similar to the appearance of the digital representation of whiteboard 320 (325), the augmented scene presented on digital display 310 appears more natural or realistic than the augmented scene presented on digital display 210.

However, computing device 300 is not limited to analyzing the perspective geometry of the scene. Computing device 300 can analyze and manipulate the digital object based on any scene property that alters visual properties of objects within the scene, including, but not limited to, lighting, inter-reflection, and shadow. Furthermore, the rendered digital object is not limited to digital paintings, but can include any type visual item that can be displayed on a digital display including, but not limited to, any type of image, graphic, text string, or video.

Figure 4:
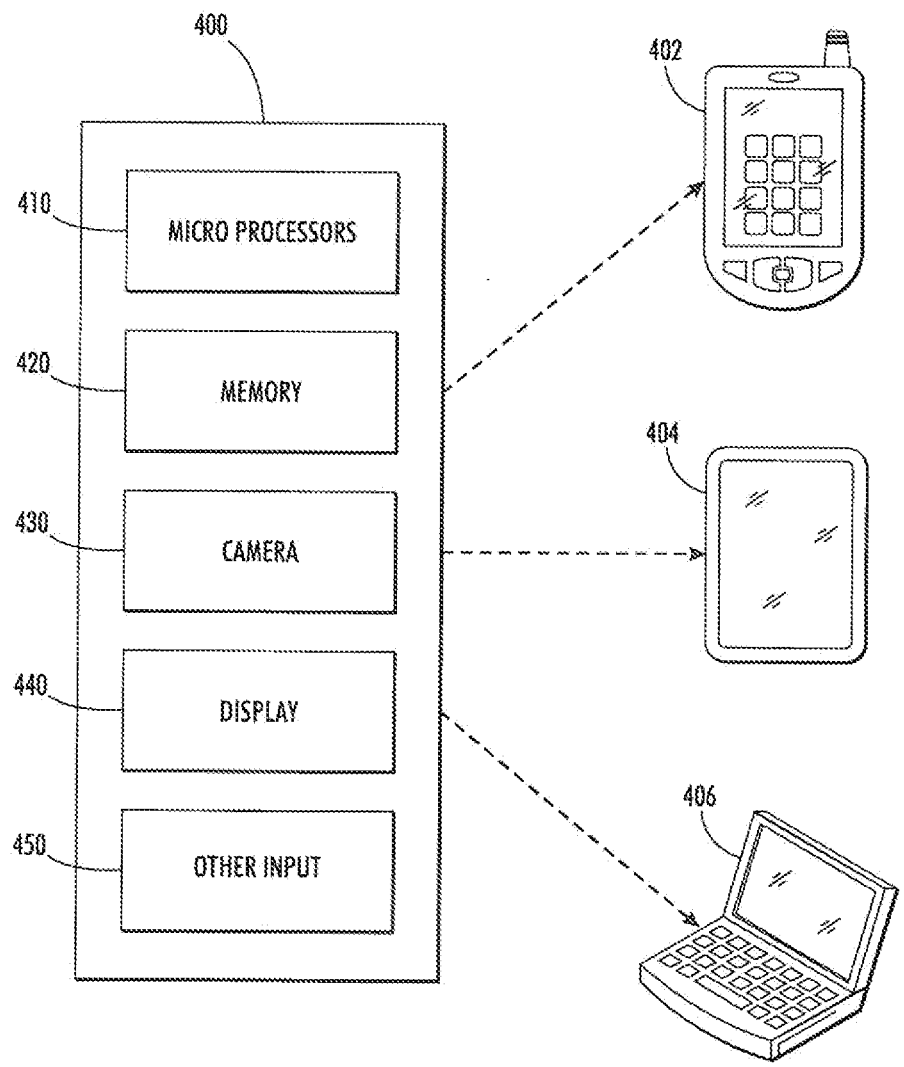
FIG. 4 is a diagram depicting an exemplary computing device that may utilize AR technology, consistent with certain disclosed embodiments.

FIG. 4 is a diagram depicting an exemplary computing device that may utilize AR technology, consistent with certain disclosed embodiments. Computing device 400 may represent any type of one or more computing devices able to receive input from camera 430 and output to display 440. For example, computing device 400 may represent cellular phone 402, tablet computer 404, or laptop 406. Additionally, in some embodiments, camera 430 and display 440 can be integrated with computing device 400.

Computing device 400 may include, for example, one or more microprocessors 410 of varying core configurations and clock frequencies; one or more memory devices or computer-readable media 420 of varying physical dimensions and storage capacities, such as flash drives, hard drives, random access memory, etc., for storing data, such as images, files, and program instructions for execution by one or more microprocessors 410; one or more transmitters for communicating over network protocols, such as Ethernet, code divisional multiple access (CDMA), time division multiple access (TDMA), etc. Components 410 and 420 may be part of a single device as disclosed in FIG. 4 or may be contained within multiple devices. Those skilled in the art will appreciate that the above-described componentry is exemplary only, as device 400 may comprise any type of hardware componentry, including any necessary accompanying firmware or software, for performing the disclosed embodiments.

Furthermore, computing device 400 can include additional input devices 450 that are integrated with the device or capable of sending information to the device. Such input devices can include, but are not limited to, a microphone, an accelerometer, a gyroscope, a proximity sensor, and a global positioning sensor.

Figure 5:
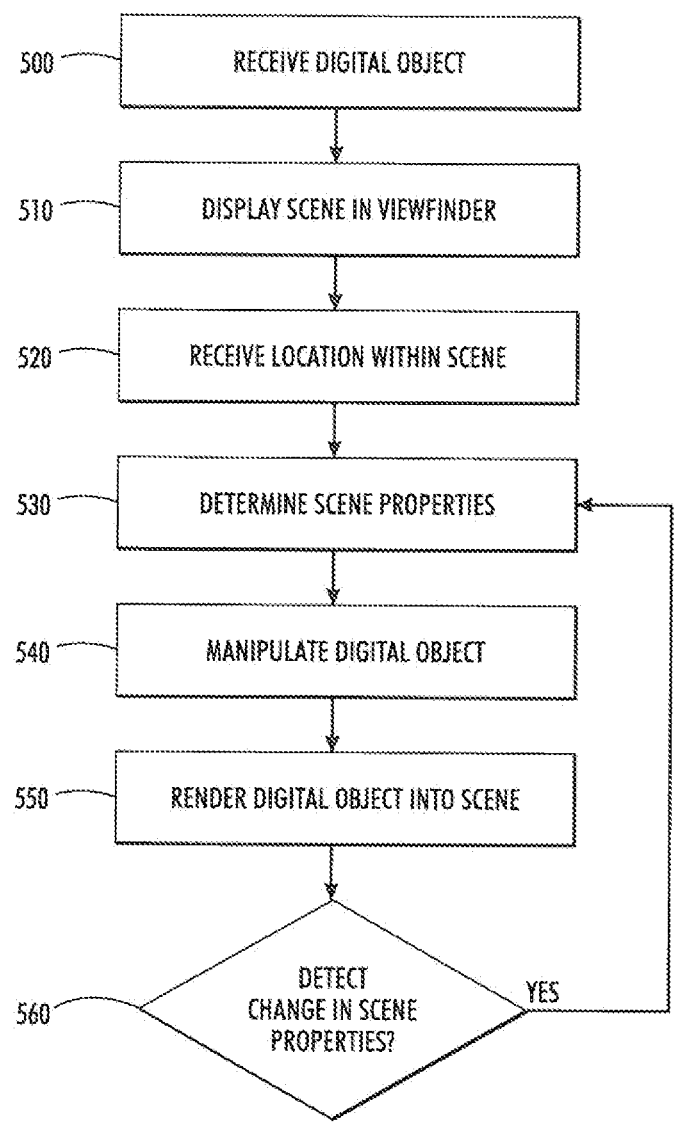
FIG. 5 is a flow diagram illustrating an exemplary method of implementing AR technology on a computing device, consistent with certain disclosed embodiments.

FIG. 5 is a flow diagram illustrating an exemplary method of implementing AR technology on a computing device, consistent with certain disclosed embodiments. The process can begin when a user initiates an AR application on a computing device having an attached camera and display, such as a tablet computer. In 500, the computing device can receive a digital object. Digital objects can include any digital object that can be depicted on a display, such as an image file, a graphic file, a video file, or a text string. Further, a digital object can include a plurality of files that are all the same media type or include various different media types. In some embodiments, the user can choose from a set of digital objects that are included with the AR application. For example, the application can include a set of stock photographs or paintings for use with the AR application. Additionally, the user can choose to select a digital object from among digital files already stored on the device. For example, the user could select a photograph locally stored on the device or a drawing created using a painting application.

Further, the user can select a digital object using a network connection and access a digital object that is stored on a different computing device or use an Internet browser to select a digital object from a website. For example, the user can visit a website advertising a selection of paintings for purchase. The website can include image files corresponding to the available paintings for viewing and downloading via the website. In some embodiments, the Internet browser can have a plugin associated with the AR application running with the browser and the user can select digital objects found on a website and select an option to render the digital object using the AR application. In other embodiments, the user can download the digital object using the Internet browser and then import the digital object into the AR application.

In some embodiments, the computing device can suggest one or more digital objects to the user based on, for example, stored preferences of the user or indications from the user of the type of digital object desired. The computing device can automatically select a digital object for the user, allow the user to select from a list of the one or more digital objects, allow the user to request a new list of digital objects, or allow the user to disregard the list and choose his/her own digital object.

In further embodiments, the computing device can suggest one or more digital objects to the user based on a user location derived from the GPS in the computing device. In yet further embodiments, the computing device can suggest one or more digital objects to the user based on analysis of the properties of the scene and other physical objects in the scene. Examples of scene and object properties include color, size, shape, texture.

In 510, the computing device can display in a viewfinder a digital display of the scene in front of the user. A viewfinder can be a digital representation based on a direct feed from a camera and can display in real time a digital depiction of graphical information received from the camera. For example, if the camera is pointed at a wall, the viewfinder can depict a digital representation of the wall on the display.

In some embodiments, the computing device can prompt the user to select a location within the viewfinder scene depicted on the display to render the digital object. In 520, the computing device receives a location on the scene to render the digital object. The computing device can receive the location directly from the user. For example, the digital display can include touchscreen functionality, and the user can select a location by physically touching a location on the display. In other embodiments, the user can use other input devices to indicate a chosen location, including, but not limited to, a computer mouse, a keyboard, a voice command, and a touchpad.

In some embodiments, the computing device can suggest locations within the scene to render a digital object. For example, the computing device can detect and suggest empty planar surfaces, such as an empty wall, to render the digital object. Additionally, the computing device can suggest one or more locations based on the aesthetics of the background scene, including, but not limited to, surface aesthetics, surface size, scene lighting, and other physical objects within the scene. Further, the computing device can suggest one or more locations based on aesthetics of the digital objects, including, but not limited to, the size, the shape, and the aesthetics of the digital object. The user can then select one of the suggested locations using the input devices mentioned above.

Once a location is selected by the user, the exact chosen location can be used as the center position for rendering the digital object. Alternately, the computing device can choose an optimal location for rendering a digital object based on the location chosen by the user. For example, if the user selects a location that is not located on a planar surface, the computing device can select an optimal location that is in the same vicinity as the user chosen location.

In 530, the computing device can determine a scene property from the scene depicted on the viewfinder. For example, the computing device can determine the perspective geometry of the scene by analyzing the perspective geometry of one or more objects within the scene. The computing device can determine that an object depicted on the display is an object that is normally rectangular in shape but does not appear rectangular on the display. Based on the perspective projection of the object, the computing device can determine the position of the camera relative to the scene and/or the perspective geometry of objects in the scene. In embodiments, the determined position can be based on the angle of the view of the camera, and/or on the distance of the camera from objects depicted in the scene. Additionally, the computing device can utilize known edge and line detection technologies and vanishing point analysis to estimate perspective projection and three-dimensional geometry of the camera relative to the scene.

In further embodiments, the computing device can direct the user to position the computing device such that the camera view is parallel to a planar surface, such as a wall. Once the user indicates that the camera has a parallel view to the planar surface the computing device can determine the scene geometry and location of the computing device. Further, in some embodiments, the computing device can direct the user to position the computing device a specific distance from a planar surface. For example, the computing device can direct the user to position the computing device ten feet from a wall. Once the user indicates that the camera is the specified distance from the wall, the computing device can determine the scene geometry and/or location of the camera relative to the wall.

In addition to determining perspective geometry of the scene, the computing device can also determine other scene properties, including, but not limited to, lighting, inter-reflection, and shadow.

In 540, the computing device can manipulate the digital object based on the determined scene properties and based on the chosen location within the scene. For example, if the computing device determines that the scene geometry is based on a perspective projection of a planar surface and the chosen location is a specific point on the planar surface, then the computing device can apply a perspective transformation on the digital object based on the determined perspective geometry of the scene. Thus, if the digital object is a digital representation of a painting that should be rectangular in shape from a direct view, the computing device can apply a perspective transformation to the digital representation of the painting so as to provide a natural appearance within the scene.

Additionally, the computing device can adjust the size of the digital object based on the determined distance from the planar surface. The computing device can adjust the size based on the amount of open space available on the planar surface, or the computing device can utilize measurements associated with the digital object to determine the relative size based on the camera's distance from the planar surface.

Further, the computing device may determine that the scene geometry is not based on a parallel view of the planar surface associated with the chosen location, for example, by determining that one or more background objects or one or more background planar surfaces appear skewed on the display. The computing device can then apply a perspective transformation on the digital object based on the determined perspective geometry of the scene, one or more background objects, or one or more background planar surfaces, as depicted in FIG. 3 and digital object 340. The computing device can also adjust the size of the digital object using the methods described above.

However, manipulating the digital object is not limited to manipulation based on the scene perspective geometry. The digital object can additionally be manipulated based on other scene properties, including, but not limited to, lighting, inter-reflection, and shadow.

In 550, the computing device can render the digital object into the scene depicted in the viewfinder. In some embodiments, the digital object can be rendered onto the scene prior to manipulation. The computing device may then subsequently manipulate the digital object or may allow the user to direct the manipulation of the digital object. In other embodiments, the computing device can render the digital object into the scene by using the manipulated digital object created in 540. The computing device can render the digital object in a position based on the determined location from 520.

Once the manipulated digital object is rendered onto the scene, in some embodiments, the user can further manipulate the digital object. For example, the computing device can allow the user to use any input of the device to increase or decrease the size of the digital object. Further, the computing device can allow the user to further manipulate properties of the digital object and the scene, including the perspective geometry of the digital object, the lighting, the inter-reflection, and the shadows in the scene.

In 560, the computing device can detect one or more changes to various scene properties. For example, the computing device can detect a change to the perspective geometry of a background object in the scene.

In some embodiments, the computing device can use other sensors resident on the device to determine that the scene properties have changed, including, but not limited to, a microphone, an accelerometer, a gyroscope, a proximity sensor, and a global positioning sensor. For example, the computing device can use one or more of the accelerometer, the gyroscope, the proximity sensor, and the global positioning sensor to determine that the computing device has moved from its original position. Further, the computing device can use the microphone to receive verbal input from the user indicating the change in position of the computing device. Once a movement is detected, the computing device can determine that a change to the scene properties has likely occurred and can, in some embodiments, re-initiate 530.

Further, the computing device can utilize the input from the other sensors on the device to efficiently determine the new location. In some embodiments, the computing device can use such input to determine the amount of movement that occurred and the new camera position. In other embodiments, the computing device can use the input from the other sensors in combination with the above-referenced methods for determining scene properties directly from the captured image to expedite the determination of new scene properties. For example, the computing device can utilize the input from an accelerometer to determine a new perspective of one or more objects in the scene by analyzing the determined movement and/or the change in position of the camera. The process can then proceed to 540, as described above, and in 550 the first inserted digital object can be replaced with a new digital object manipulated based on the movement, the new perspective, and/or the new location of the camera.

Accordingly, the visual properties of the digital object can be altered in real time based on the movement of the computing device and/or background objects. Thus, the rendered object appears incorporated into the live scene in a natural manner and can provide the user with an improved and realistic augmented image.

In some embodiments, the user can choose to add an additional digital object into the scene and select a location to place the additional digital object in the scene. The additional digital object can be manipulated identically to the first digital object, or the additionally digital object can be independently manipulated, as described above, based on the scene properties and the chosen location.

While the steps depicted in FIG. 5 have been described as performed in a particular order, the order described is merely exemplary, and various different sequences of steps can be performed, consistent with certain disclosed embodiments. Further, the steps described are not intended to be an exhaustive or absolute, and various steps can be inserted or removed. For example, in some embodiments, the computing device can initiate the process by displaying the viewfinder on the display when the user initiates either the viewfinder of the computing device or the AR application. The user can then select an option to render a digital object onto the scene and can, subsequently, choose a digital object to render and a location.

Additionally, the user can request for the computing device to suggest digital objects to the user or the computing device can automatically suggest digital objects to the user based on the aesthetics of the scene captured on the viewfinder. For example, the computing device could determine various aesthetic properties of the scene and background objects including, but not limited to, smooth areas, color patterns and schemes, open space dimensions, room dimensions, lighting of the scene, and current design patterns, and can utilize the scene properties to determine one or more digital objects to suggest to the user. The computing device can determine the one or more digital objects based on features that include, but are not limited to, color, size, shape, and design of the digital object. The computing device can provide the user with the option to accept one or more of the suggested digital objects or disregard the suggestions, as described above.

In other embodiments, the computing device can display the viewfinder and then the user can first select a location and, subsequently, select a digital object to render.

In further embodiments, the computing device can initiate the process by determining the scene properties before a location and an object are selected. The AR application can run with the viewfinder or the AR application can run a separate viewfinder and, in either embodiment, can determine scene properties to apply to any inserted digital objects. Further, the computing device can direct the user to position the device so as to obtain a parallel view of a planar object at a specified distance before allowing the user to select a location and/or digital object.

In additional embodiments, the computing device can initiate the process by prompting the user to select a location within the scene and then receiving a location within the scene from the user. Subsequently, the computing device can allow the user to select a digital object and can determine scene properties.

Other embodiments can utilize a projector attached the computing device to project the digital object onto the live scene. Such a projection can aid the user in determining the actual appearance of a non-digital version of the object on the background scene.

The perspectives depicted in the figures and described in the specification are also not to be interpreted as limiting. Those of skill in the art will appreciate that different embodiments of the invention may include perspectives from any angles that enable a computing device to display scene information onto a display.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments. The steps described need not be performed in the same sequence discussed or with the same degree of separation. Likewise, various steps may be omitted, repeated, or combined, as necessary, to achieve the same or similar objectives or enhancements. Accordingly, the present disclosure is not limited to the above-described embodiments, but instead is defined by the appended claims in light of their full scope of equivalents.

What is claimed is:

1. A method of rendering in real time a virtual object onto a viewfinder display, the method comprising:
    displaying a website comprising a plurality of virtual objects;
    receiving, from a user and via the website, a selection of an option to render a virtual object;
    receiving, from the user and via the website, a selection of a virtual object of the plurality of virtual objects;
    prompting, via a device comprising a viewfinder display, the user to position the device in a first position parallel to a planar surface in a view of the device;
    receiving a signal from the user that the device is in the first position;
    determining one or more scene properties of a first scene on the viewfinder display of the device at the first position, wherein the one or more scene properties of the first scene comprise one or more of lighting, inter-reflection, and shadow;
    determining a location for placing the virtual object within the first scene, wherein determining the location for placing the virtual object comprises:
        receiving an indication of a user-chosen location from the user;
        determining that the user-chosen location is not an optimal location; and
        selecting the location that is different from the user-chosen location and in the same vicinity as the user-chosen location;
    determining a first appearance of the virtual object based on the one or more scene properties of the first scene, wherein determining the first appearance of the virtual object comprises adjusting, in real time, the first appearance of the virtual object based on the one or more of lighting, inter-reflection, and shadow of the first scene;
    inserting the virtual object with the first appearance into the first scene depicted on the viewfinder display of the device based on the location;
    detecting a movement of the device to a second position, wherein the device is no longer parallel to the planar surface;
    determining one or more scene properties of a second scene on the viewfinder display of the device at the second position, wherein the one or more scene properties of the second scene comprise one or more of lighting, inter-reflection, and shadow;
    determining a second appearance of the virtual object based on the one or more scene properties of the second scene, wherein determining the second appearance of the virtual object comprises adjusting, in real time, the second appearance of the virtual object based on the one or more of lighting, inter-reflection, and shadow of the second scene; and
    inserting the virtual object with the second appearance into the second scene depicted on the viewfinder display of the device based on the location.

2. The method of claim 1, wherein the one or more scene properties of the first scene and the second scene comprise perspective geometry of one or more surfaces within the first scene and the second scene.

3. The method of claim 2, wherein determining the second appearance of the virtual object comprises applying a perspective transformation on the virtual object based on the perspective geometry of the one or more surfaces within the second scene.

4. The method of claim 2, wherein determining the one or more scene properties of the first scene and the second scene comprises performing one or more of edge detection, binarization, straight line detection, and vanishing point analysis.

5. The method of claim 1, wherein the device is one of a mobile phone, a tablet computer, and a laptop computer.

6. The method of claim 1, wherein the virtual object is one of an image, a graphic, a text string, and a video.

7. The method of claim 1, wherein receiving the indication of the location from the user comprises receiving the indication of the location via input to a touchscreen display.

8. The method of claim 1, further comprising:
    determining one or more objects to recommend to a user based on one or more of size of smooth areas, objects in the scene, color schemes of the scene, and lighting of the scene.

9. The method of claim 1, wherein determining a location for placing the virtual object comprises determining one or more locations to recommend to a user based on one or more of surface aesthetics, surface size, and lighting.

10. The method of claim 1, wherein the movement of the device is detected by one or more of:
    tracking changes in the one or more scene properties of the first scene induced by the movement;
    receiving data from an accelerometer;
    receiving data from a gyroscope;
    receiving data from a proximity sensor;
    receiving data from a global positioning sensor; and
    receiving data from a microphone.

11. The method of claim 1, further comprising projecting an image of the virtual object onto the first scene and the second scene using a projector.

12. The method of claim 1, wherein determining that the user-chosen location is not an optimal location comprises determining that the user-chosen location is not on a planar surface.

13. A system configured to render in real time a virtual object onto a viewfinder display, the system comprising:
- a processing system comprising one or more processors; and
- a memory system comprising one or more computer-readable media, wherein the one or more computer-readable media contain instructions that, when executed by the processing system, cause the processing system to perform operations comprising:
  - displaying a website comprising a plurality of virtual objects;
  - receiving, from a user and via the website, a selection of an option to render a virtual object;
  - receiving, from the user and via the website, a selection of a virtual object of the plurality of virtual objects;
  - prompting, via a device comprising a viewfinder display, the user to position the device in a first position parallel to a planar surface in a view of the device;
  - receiving a signal from the user that the device is in the first position;
  - determining one or more scene properties of a first scene on the viewfinder display of the device at the first position, wherein the one or more scene properties of the first scene comprise one or more of lighting, inter-reflection, and shadow;
  - determining a location for placing the virtual object within the scene, wherein determining the location for placing the virtual object comprises:
    - receiving an indication of a user-chosen location from the user;
    - determining that the user-chosen location is not an optimal location; and
    - selecting the location that is different from the user-chosen chosen location and in the same vicinity as the user-chosen location;
  - determining a first appearance of the virtual object based on the one or more scene properties of the first scene, wherein determining the first appearance of the virtual object comprises adjusting, in real time, the first appearance of the virtual object based on the one or more of lighting, inter-reflection, and shadow of the first scene;
  - inserting the virtual object with the first appearance into the first scene depicted on the viewfinder display of the device based on the location;
  - detecting a movement of the device to a second position, wherein the device is no longer parallel to the planar surface;
  - determining one or more scene properties of a second scene on the viewfinder display of the device at the second position, wherein the one or more scene properties of the second scene comprise one or more of lighting, inter-reflection, and shadow;
  - determining a second appearance of the virtual object based on the one or more scene properties of the second scene, wherein determining the second appearance of the virtual object comprises adjusting, in real time, the second appearance of the virtual object based on the one or more of lighting, inter-reflection, and shadow of the second scene; and
  - inserting the virtual object with the second appearance into the second scene depicted on the viewfinder display of the device based on the location.

14. The system of claim 13, wherein the one or more scene properties of the first scene and the second scene comprise perspective geometry of one or more surfaces within the first scene and the second scene.

15. The system of claim 13, the operations further comprising:
- determining one or more objects to recommend to a user based on one or more of size of smooth areas, objects in the scene, color schemes of the scene, and lighting of the scene.

16. The system of claim 13, wherein the movement of the device is detected by one or more of:
- tracking changes in the one or more scene properties of the first scene induced by the movement;
- receiving data from an accelerometer;
- receiving data from a gyroscope;
- receiving data from a proximity sensor;
- receiving data from a global positioning sensor; and
- receiving data from a microphone.

17. The system of claim 13, wherein determining that the user-chosen location is not an optimal location comprises determining that the user-chosen location is not on a planar surface.

18. A non-transitory computer-readable storage medium having a program stored thereon, the program when executed by a computing device performs a method comprising:
- displaying a website comprising a plurality of virtual objects;
- receiving, from a user and via the website, a selection of an option to render a virtual object;
- receiving, from the user and via the website, a selection of a virtual object of the plurality of virtual objects;
- prompting, via a device comprising a viewfinder display, the user to position the device in a first position parallel to a planar surface in a view of the device;
- receiving a signal from the user that the device is in the first position;
- determining one or more scene properties of a first scene on the viewfinder display of the device at the first position, wherein the one or more scene properties of the first scene comprise one or more of lighting, inter-reflection, and shadow;
- determining a location for placing the virtual object within the scene, wherein determining the location for placing the virtual object comprises:
  - receiving an indication of a user-chosen location from the user;
  - determining that the user-chosen location is not an optimal location; and
  - selecting the location that is different from the user-chosen location and in the same vicinity as the user-chosen user chosen location;
- determining a first appearance of the virtual object based on the one or more scene properties of the first scene, wherein determining the first appearance of the virtual object comprises adjusting, in real time, the first appearance of the virtual object based on the one or more of lighting, inter-reflection, and shadow of the first scene;
- inserting the virtual object with the first appearance into the first scene depicted on the viewfinder display of the device based on the location;
- detecting a movement of the device to a second position, wherein the device is no longer parallel to the planar surface;
- determining one or more scene properties of a second scene on the viewfinder display of the device at the second position, wherein the one or more scene properties of the second scene comprise one or more of lighting, inter-reflection, and shadow;
- determining a second appearance of the virtual object based on the one or more scene properties of the second scene, wherein determining the second appearance of the virtual object comprises adjusting, in real time, the second appearance of the virtual object based on the one or more of lighting, inter-reflection, and shadow of the second scene; and inserting the virtual object with the second appearance into the second scene depicted on the viewfinder display of the device based on the location.

19. The non-transitory computer-readable storage medium of claim 18, wherein the one or more scene properties of the first scene and the second scene comprise perspective geometry of one or more surfaces within the first scene and second scene.

20. The non-transitory computer-readable storage medium of claim 19, wherein determining that the user-chosen location is not an optimal location comprises determining that the user-chosen location is not on a planar surface.

* * * * *